June 13, 1933.  E. J. SCHMIDT  1,913,415
DISPLAY DEVICE
Filed Nov. 21, 1929   2 Sheets-Sheet 1
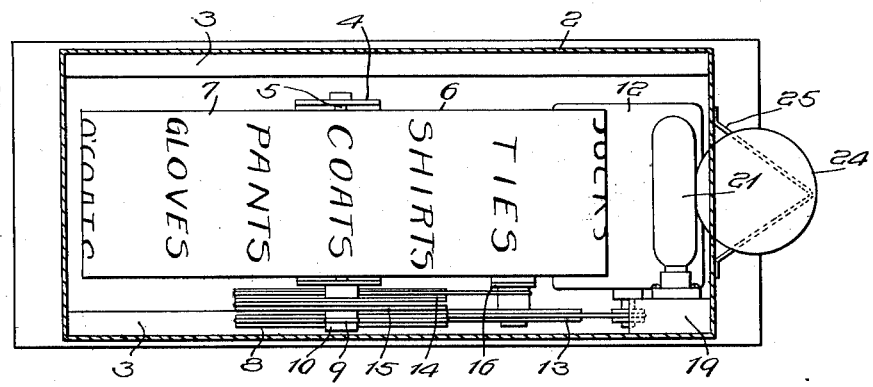
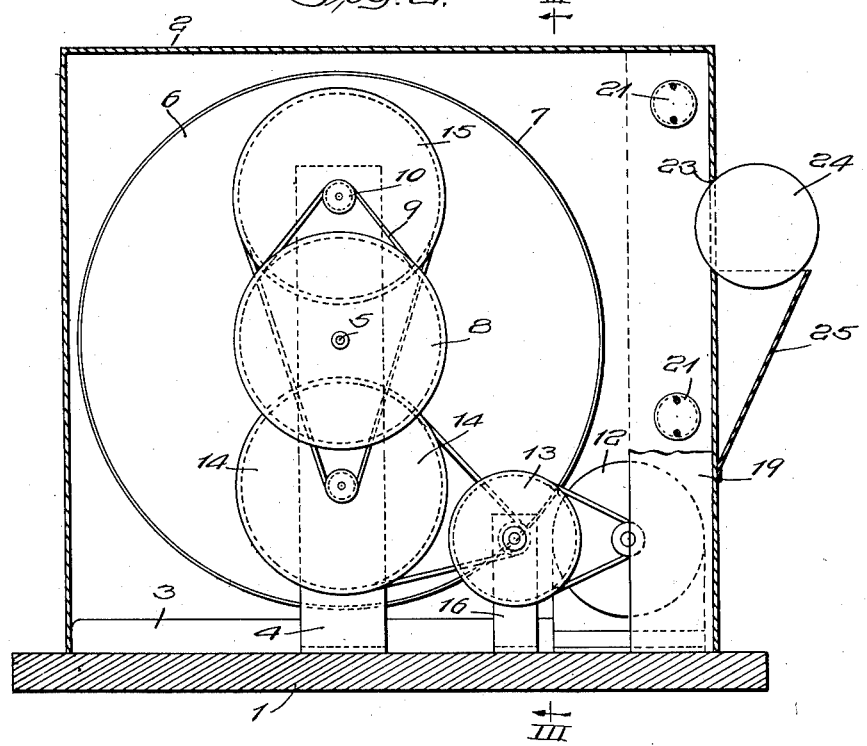

June 13, 1933.     E. J. SCHMIDT     1,913,415
DISPLAY DEVICE
Filed Nov. 21, 1929     2 Sheets-Sheet 2
Fig. 3.
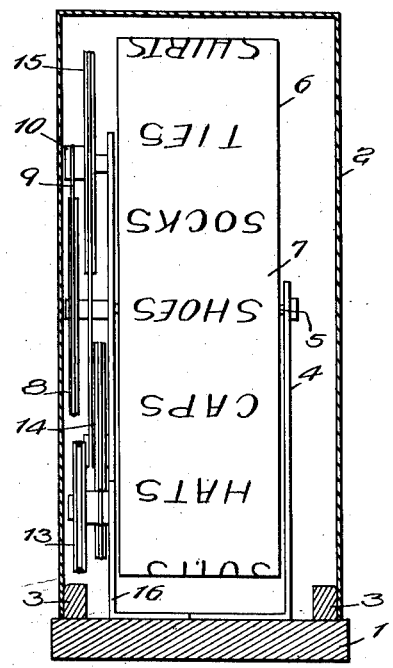
Fig. 4.
Fig. 6
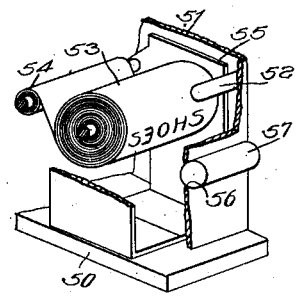
Fig. 5.
Fig. 7.
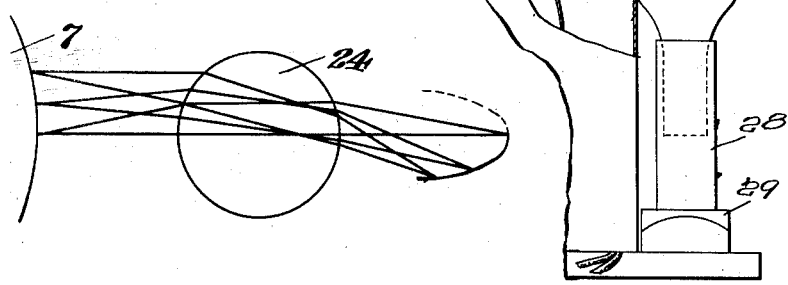
Witness:
William P. Kilroy
Inventor:
Erwin J. Schmidt
By Brown, Jackson, Boettcher & Dienner
Attys.

Patented June 13, 1933

1,913,415

UNITED STATES PATENT OFFICE

ERWIN J. SCHMIDT, OF CHICAGO, ILLINOIS, ASSIGNOR TO CHRISTEN CHRISTENSEN, OF MAYWOOD, ILLINOIS, A CORPORATION OF ILLINOIS

DISPLAY DEVICE

Application filed November 21, 1929. Serial No. 408,693.

This invention relates to display devices and particularly to those of the character wherein words, sketches, pictures, objects, or advertising matter of any kind are presented so as to be displayed before the public. The successful use of such devices depends mainly upon their ability to attract and retain the attention of the public.

One object of my invention is, therefore, the provision of a display device so constructed and arranged that the material to be viewed by the public is presented in a manner calculated to attract attention and retain the interest of those viewing the device.

Another object of my invention is to provide a display device in which a movable member carries the objects, sketches, or the like, to be presented, and in such a manner that a saving of space is effected. A still further object of my device is to provide a display means in which the advertising matter or material to be presented is lighted and is brought to a focus by a convergent lens which is of such optical characteristics that the advertising matter appears to be within the lens itself, producing thereby a novel effect and one which will attract and retain the attention of the passer by. Another object of my invention is the provision, in combination with a display device having the above characteristics, of a drum which is lighted and is adapted to be rotated so as to bring the advertising or other material within a proper distance from the convergent lens, this distance preferably being greater than the focal length of the lens so that a real inverted image of the matter to be displayed is formed. A still further object of my invention is to utilize a substantially spherical crystal which forms a convergent lens for use in display devices of the above described character and which has a short focus.

Other objects and advantages of my invention will be apparent to those skilled in the art to which my invention appertains after a consideration of the following detailed description taken in conjunction with the accompanying drawings, in which:

Figure 1 is a top view showing all the parts in plan except the housing member which is shown in section;

Figure 2 is a side view showing all the parts in elevation except the housing which is shown in section;

Figure 3 is an end view, partly in section, taken substantially on the line III—III of Figure 2;

Figure 4 is a fragmental view showing approximately the appearance of the image formed in the crystal;

Figure 5 is a view showing the housing partly broken away and illustrating a modified form of lens or crystal, in which the latter is formed by a substantially spherical flask filled with water or other suitable liquid;

Figure 6 is a fragmentary and more or less diagrammatic perspective view with parts broken away and showing another form of the present invention; and Figure 7 is a sketch illustrating the path of the light rays from the drum through the lens.

In the drawings, 1 indicates a suitable form of base which has mounted upon it a cabinet or housing 2 adapted to enclose the working parts of my device. The housing member 2 is held in place on the base by a number of strips 3 secured thereto in desirable manner such as by nailing or the like. Upstanding from the base is a U-shaped bracket member 4 in which is journaled the shaft 5, as shown in Figure 3, and which carries fixed thereto a drum 6 having a substantially wide peripheral surface adapted to carry such printing, pictures, sketches, objects, or other advertising material which it may be desired to have displayed before the public. At one end the shaft 5 is extended and has fixed thereto a pulley wheel 8 which is adapted to be driven by a belt 9.

The belt 9 is trained over a pulley 10 which is driven by a motor 12 through other pulley wheels 13, 14 and 15, as is clearly shown in Figure 2. The pulley wheel 13 is rotatably carried on the base member 1 by means of a bracket 16 secured thereto while the other pulley wheels, 14 and 15, are rotatably carried by one leg of the U-shaped bracket 4, as shown in Figure 3.

An upstanding bar 19 is mounted vertically upon the base member 1 and carries a pair of electric lamps 21, these lamps being spaced apart a substantial distance whereby the peripheral surface 7 of the drum is effectively illuminated.

Forwardly of, but approximately in a plane midway between the lamps 21 the housing member 2 is provided with an aperture 23 through which the material carried on the peripheral surface 7 of the drum 6 can be easily observed. The aperture 23 is adapted to receive a short focus lens, such as a crystal 24, and in order to support the crystal in proper position so that the surface of the drum 6 is spaced from the lens 24 a distance somewhat in excess of the first principal focal distance of the lens, the housing 2 is provided with a bracket or shelf member 25 immediately underneath the aperture 23.

In Figure 5, I have shown a slightly different modification in which I have substituted a substantially spherical flask 26 filled with water or other transparent liquid and having the neck thereof extending downwardly in and supported by a tubular supporting member 28, the latter being provided with a base 29 supported upon the base member 1.

Any suitable liquid having the proper index of refraction and being substantially transparent may be used instead of water with which to fill the flask 26.

In operation the motor 12 will be connected to any suitable source of power and by this means the drum 6 will be slowly rotated. The lamps 21 may be connected to the same or to a different source of power. From Figure 2 it will be observed that light emanating from the lamps 21 will illuminate the material carried on the peripheral surface 7 of the drum 6 and will be reflected therefrom and concentrated by the lens member 24 whereby to form an observable image. I preferably employ such means as a crystal or a substantially spherical liquid-filled flask as will provide a relatively thick convergent lens having a short focus. By the term "lens" I intend to include all means which are adapted to refract rays of light and form the same into an observable image. Preferably I arrange the drum 6 behind the lens 24 a distance greater than the focal length of such lens whereby the image formed by it will be real and inverted. Thus by inverting the material placed on the surface 7 the image observed through the lens 24 will appear to be erect.

From Figures 2 and 5 it will be observed that the aperture 23 is of considerable size compared to the diameter of the lens 24 or the flask 26. As is well known, when lenses are used in conjunction with large apertures considerable spherical aberration occurs, that is, the image is distorted and is also curved.

In the type of lens which I employ the central portion of the image is magnified more than the edge portions which, with the curvature of the image, produces the illusion that the image observed has depth and apparently is formed in the lens itself. Thus when the drum is rotated the images appear to move over the surface of the lens producing, not only outlines of great clarity, but also outlines which attract considerable interest.

In the embodiment illustrated in Figure 6 the base of the device is indicated at 50, the housing at 51 and the incandescent lamp or other source of light is indicated at 52. In this case the matter for display is carried by a roll of material 53 analogous to a motion picture film but not transparent and at least of such a nature that the light from the lamp 52 will be reflected from the material 53. A roll or reel as indicated at 54 for the purpose of receiving the material unwound from the roll 53 and the roll 53 may be carried in bracket means 55 supported upon the base 50. The front of the housing 51 is provided with an aperture 56 similar to the previous embodiment, and in this case the lens 57 which is mounted adjacent said aperture and adapted to receive the light reflected from the material 53 and to form an image of the matter on said material is in the form of a cylindrical lens. In this case a portion, at least, of the effect of the preceding embodiment will be obtained and the appended claims are therefore to be construed accordingly.

Having thus described my invention and the preferred embodiment thereof, what I claim and desire to secure by Letters Patent is:

1. A display device comprising the combination of means providing a surface adapted to carry advertising material, a source of light, and means to receive and refract the light reflected from said surface and material and adapted to form a real image of the same, which is curved and distorted and in which the peripheral parts are compressed, said means comprising a substantially spherical lens having a short focal length and being disposed from said surface and material a distance greater than the focal length of the lens.

2. A display device comprising the combination of means providing a surface adapted to carry advertising material, a source of light, and means to receive the light reflected from said surface and material and adapted to form an image of the same, said means comprising a convergent lens of short focal length and of wide aperture and said surface subtending a considerable angle at the lens and disposed at a distance therefrom greater than the focal length of the lens, whereby the central portion of said image appears larger than the edge portions, creating a curved distorted image.

3. A display device comprising the combination of means providing a surface adapted to carry advertising material, a source of light illuminating said surface and material, a housing surrounding said means and said source of light, and means acting as a short focus convergent lens spaced a distance from said surface greater than the first focal distance of the said lens, whereby a real inverted image of the advertising material is formed observable at a distance from the lens, the distance between a point on said surface and said lens being increasingly greater the further said point is from the principal axis of the lens.

4. A display device comprising the combination of means providing a surface adapted to carry advertising material, a source of light adapted to illuminate said surface and material, and a thick convergent lens of approximate spherical formation having a short focus and mounted in operative position adjacent said surface but at a distance therefrom greater than the first focal distance of said lens whereby a real inverted image is formed and which appears to diverge from points within the lens, said surface being curved away from the lens.

5. A display device comprising the combination of a base, a rotatable drum carrying advertising material on its peripheral surface, means mounting said drum on the base, a motor, driving means whereby the drum is rotated by the motor, a source of light comprising at least one lamp supported by the base and mounted to be adjacent the peripheral surface of the drum, means acting as a substantially spherical lens of short focal length and mounted to receive the light reflected from said surface and spaced therefrom a distance greater than the focal length of the lens, and a housing carried by the base and enclosing the drum and lamps and provided with an aperture adjacent said lens means, the surface of said rotatable drum being curved away from said lens means whereby a real inverted image of the advertising material is formed and which is curved and distorted with the central portions extended and the peripheral portions contracted.

6. A display device comprising, in combination, movable means providing a surface adapted to carry units of advertising material and the like, means to move said material at a uniform rate, and means acting as a generally spherical lens spaced from said material a sufficient distance to form a real inverted image of said material, said image being distorted and curved so that as said material moves the image thereof is alternately expanded and compressed, and said surface being curved away from said lens so that as said units of advertising material approach and recede from the lens, said alternate extension and contraction of the distorted image is thereby accentuated.

In witness whereof, I hereunto subscribe my name this 31st day of March, 1931.

ERWIN J. SCHMIDT.